(12) United States Patent
Helstern

(10) Patent No.: US 7,954,857 B2
(45) Date of Patent: Jun. 7, 2011

(54) ASSEMBLY OF MULTI-USE TORQUE FITTING AND LENGTH OF TUBING HAVING COMPRESSIBLE SEAL

(75) Inventor: Gary C. Helstern, Newtown, CT (US)

(73) Assignee: Diba Industries, Inc., Danbury, CT (US)

( * ) Notice: Subject to any disclaimer, the term of this patent is extended or adjusted under 35 U.S.C. 154(b) by 459 days.

(21) Appl. No.: 12/045,071

(22) Filed: Mar. 10, 2008

(65) Prior Publication Data

US 2008/0194338 A1    Aug. 14, 2008

Related U.S. Application Data

(63) Continuation-in-part of application No. 11/382,127, filed on May 8, 2006, now abandoned, which is a continuation-in-part of application No. 11/380,501, filed on Apr. 27, 2006, now abandoned.

(51) Int. Cl.
*F16L 35/00* (2006.01)
(52) U.S. Cl. ......................................................... 285/36
(58) Field of Classification Search .................... 464/37; 285/36, 394, 395, 922, 92, 347, 349, 359, 285/362, 379; 411/7
See application file for complete search history.

(56) References Cited

U.S. PATENT DOCUMENTS

| | | |
|---|---|---|
| 345,314 A | 7/1886 | McMillan |
| 1,518,634 A | 12/1924 | Carson, Jr. |
| 1,574,052 A | 2/1926 | Mueller |
| 1,621,583 A | 3/1927 | Creighton |
| 2,021,745 A | 11/1935 | Pfefferle et al. |
| 2,258,528 A | 10/1941 | Wurzburger |
| 2,437,632 A | 3/1948 | Wolfram |
| 2,912,262 A | 11/1959 | Franck |
| 2,935,343 A | 5/1960 | Ellis |
| 3,075,792 A | 1/1963 | Franck |
| 3,287,031 A | 11/1966 | Simmons et al. |
| 3,425,314 A | 2/1969 | Ohlson |
| 3,718,065 A | 2/1973 | Liber |
| 3,937,121 A | 2/1976 | Schubert |
| 4,030,798 A | 6/1977 | Paoli |
| 4,268,103 A | 5/1981 | Schildkraut et al. |
| 4,844,570 A | 7/1989 | Tanabe |
| 4,930,951 A | 6/1990 | Gilliam |
| 5,000,721 A | 3/1991 | Williams |
| 5,145,394 A | 9/1992 | Hager |
| 5,183,140 A | 2/1993 | Nicoll |
| 5,192,219 A | 3/1993 | Fowler et al. |
| 5,215,336 A | 6/1993 | Worthing |
| 5,295,831 A | 3/1994 | Patterson et al. |
| 5,694,629 A | 12/1997 | Stephenson, III et al. |

(Continued)

FOREIGN PATENT DOCUMENTS

DE    4442075 C1    6/1996

*Primary Examiner* — Greg Binda
(74) *Attorney, Agent, or Firm* — Dinsmore & Shohl, LLP

(57) ABSTRACT

An assembly comprises a multi-use torque fitting and a length of tubing. The torque fitting generally comprises a threaded body portion and a torque-limiting body portion, wherein the threaded body portion and the torque-limiting body portion are arranged substantially concentrically along a longitudinal axis of the fitting. The length of tubing, meanwhile, generally comprises a compressible seal formed at its end. Generally, the torque fitting is configured to couple the length of tubing to a fluid port in a hermetically sealed or substantially leak-proof manner by providing a degree of compression to the compressible seal of the length of tubing sufficient to prevent substantial fluid leakage at the tube/port interface.

11 Claims, 4 Drawing Sheets

U.S. PATENT DOCUMENTS

| | | | |
|---|---|---|---|
| 5,810,533 A | 9/1998 | Nakamura | |
| 5,823,702 A | 10/1998 | Bynum | |
| 6,019,708 A | 2/2000 | Kaminski et al. | |
| 6,036,421 A | 3/2000 | Demaray | |
| 6,220,415 B1 | 4/2001 | Cosenza | |
| 6,244,804 B1 | 6/2001 | Hodge | |
| 6,270,302 B1 | 8/2001 | Lyons | |
| 6,439,091 B1 | 8/2002 | Dibbern et al. | |
| 6,499,358 B1 | 12/2002 | Hogan et al. | |
| 6,899,358 B2 | 5/2005 | Richardson | |
| 7,032,931 B2 | 4/2006 | Austin | |
| 7,299,725 B2 | 11/2007 | Helstern et al. | |
| 7,571,937 B2 | 8/2009 | Patel | |
| 2004/0036292 A1 | 2/2004 | Austin | |
| 2006/0025224 A1 | 2/2006 | Saeki et al. | |
| 2009/0218813 A1 | 9/2009 | Helstern | |

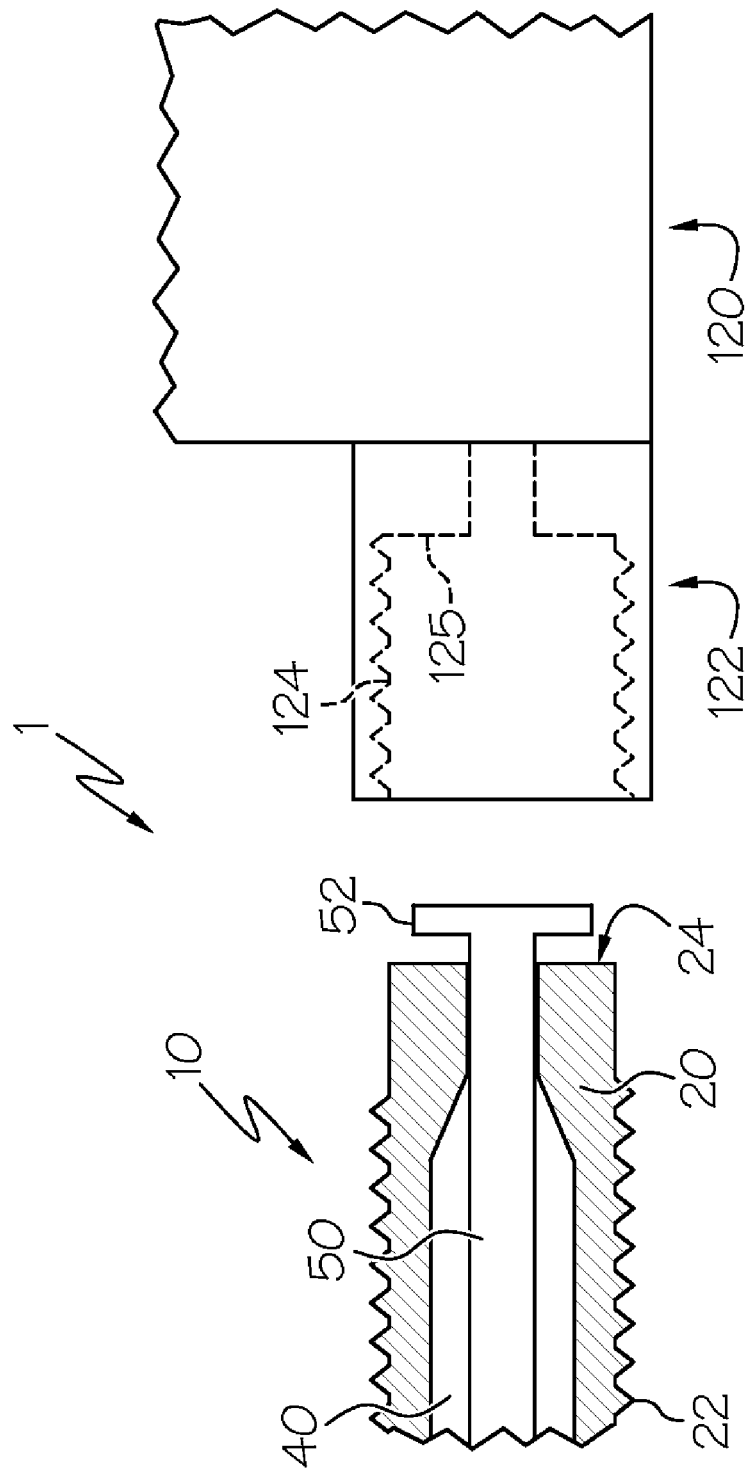

ASSEMBLY OF MULTI-USE TORQUE FITTING AND LENGTH OF TUBING HAVING COMPRESSIBLE SEAL

CROSS-REFERENCE TO RELATED APPLICATIONS

This application is a continuation-in-part of U.S. patent application Ser. No. 11/382,127, filed May 8, 2006, now abandoned, which claims the benefit of, and which is a continuation-in-part of, U.S. patent application Ser. No. 11/380,501, filed Apr. 27, 2006, now abandoned. This application is related to co-pending U.S. patent application Ser. No. 12/039,039, filed Feb. 28, 2008.

BACKGROUND OF THE INVENTION

The present invention relates to an assembly comprising a torque fitting used to secure a length of tubing to a port of a fluid manifold, a fluid valve assembly, a fluid container, or other type of fluid-handling device. The present invention also relates more generally to hardware device where it may be advantageous to control the application of torque to a threaded body portion.

BRIEF SUMMARY OF THE INVENTION

The present invention relates to an assembly comprising a multi-use torque fitting configured to couple a length of tubing to a fluid port in a hermetically sealed or substantially leak-proof manner. Generally, the configuration of the fitting prevents over-tightening or over-compression of a compressible seal formed at an end of the length of tubing and engaged between the fitting and a fluid-handling device to which the fitting is coupled while ensuring sufficient compression of the seal between the fitting and the port of the fluid-handling device.

In accordance with one embodiment of the present invention, an assembly comprises a torque fitting and a length of tubing. The torque fitting comprises a threaded body portion, a torque-limiting body portion, and a tubing channel. The threaded body portion and the torque-limiting body portion are arranged substantially concentrically along a longitudinal axis of the fitting, while the channel is oriented along the longitudinal axis of the fitting and defines a cross-sectional area sufficient to accommodate the length of tubing along the axis. The threaded body portion comprises a sealing edge on the underside of the threaded body portion and a mechanical thread defining a compressive direction of rotation and a decompressive direction of rotation. The threaded body portion and the torque-limiting body portion are configured such that, below a threshold level of torque applied to the torque-limiting body portion, rotation of the torque-limiting body portion in the compressive direction of rotation forces the threaded body portion to rotate with the torque-limiting body portion; above the threshold level of torque applied to the torque-limiting body portion, rotation of the torque-limiting body portion in the compressive direction of rotation fails to force the threaded body portion to rotate with the torque-limiting body portion; and rotation of the torque-limiting body portion in the decompressive direction of rotation forces the threaded body portion to rotate with the torque-limiting body portion. The length of tubing comprises a compressible seal formed at an end of the length of tubing and is accommodated by the channel of the torque fitting such that the compressible seal is positioned to cooperate with the sealing edge to prevent substantial fluid leakage when the assembly is applied to a fluid-handling device.

In accordance with another embodiment of the present invention, one of the threaded body portion or the torque-limiting body portion of the torque fitting of the assembly comprises a lever, while the other of the threaded body portion or the torque-limiting body portion comprises an abutment. The lever comprises a first arresting surface and a yielding surface and the abutment comprises a second arresting surface and an engaging surface. The lever and the abutment are configured such that the yielding surface of the lever and the engaging surface of the abutment engage when torque below a threshold level is applied in rotating the torque-limiting body portion in a compressive direction of rotation. The lever and the abutment are further configured such that the engaging surface contacts the yielding surface and the lever deflects an amount sufficient to allow the lever to bypass the abutment when torque above the threshold level is applied in rotating the torque-limiting body portion in the compressive direction of rotation. The deflection of the lever by the abutment causes the lever to flex toward the body portion comprising the lever and away from the body portion comprising the abutment. The lever is configured with a degree of elasticity sufficient to enable repetitive flexion of the lever, while the first and second arresting surfaces are configured to arrest relative rotation between the threaded body portion and the torque-limiting body portion when engaged. The length of tubing comprises a compressible seal formed at an end of the length of tubing is accommodated by the channel of the torque fitting such that the compressible seal is positioned to cooperate with the sealing edge to prevent substantial fluid leakage when the assembly is applied to a fluid-handling device.

In accordance with another embodiment of the present invention, the assembly further comprises a fluid-handling device in addition to the torque fitting and the length of tubing. The length of tubing comprises a compressible seal formed at an end of the length of tubing and is accommodated by the channel of the torque fitting such that the compressible seal is compressed between the sealing edge of the threaded body portion and a port of the fluid-handling device to prevent substantial fluid leakage at a tube and port interface.

In accordance with yet another embodiment of the present invention, the torque-limiting body portion and the threaded body portion do not necessarily include a channel for accommodating a length of tubing and are contemplated as being more generally applicable to any hardware device where it may be advantageous to control the application of torque to a threaded body portion. The threaded body portion may, for example, be utilized in place of a conventional bolt or screw as hardware for mechanical securement.

Accordingly, it is an object of the present invention to present a multi-use torque fitting and an assembly comprising the torque fitting and objects conjoined thereby. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIG. 7 is an illustration of an embodiment of an assembly comprising a torque fitting, a length of tubing, and a fluid-handling device, the fluid-handling device comprising a port.

DETAILED DESCRIPTION

Figure 2:
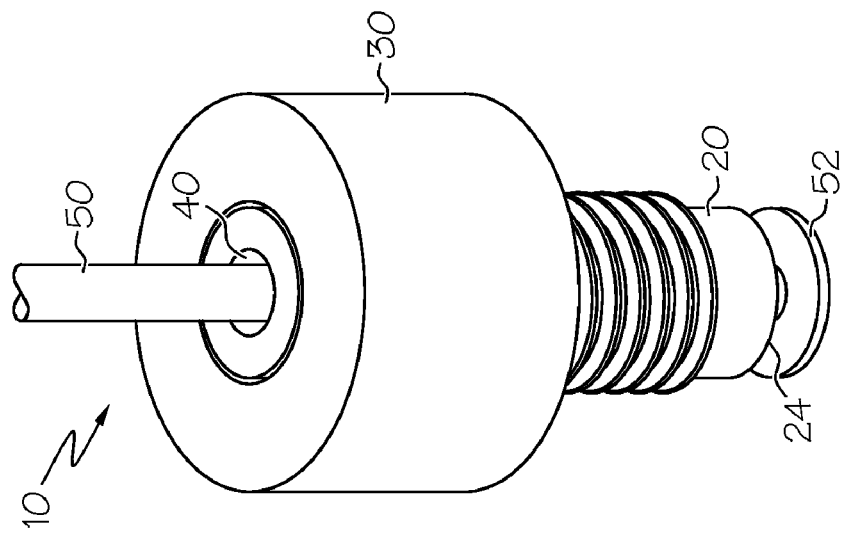
FIG. 2 is an illustration of an embodiment of an assembly according to the present invention comprising a torque fitting of the present invention and a length of tubing.
Figure 1:
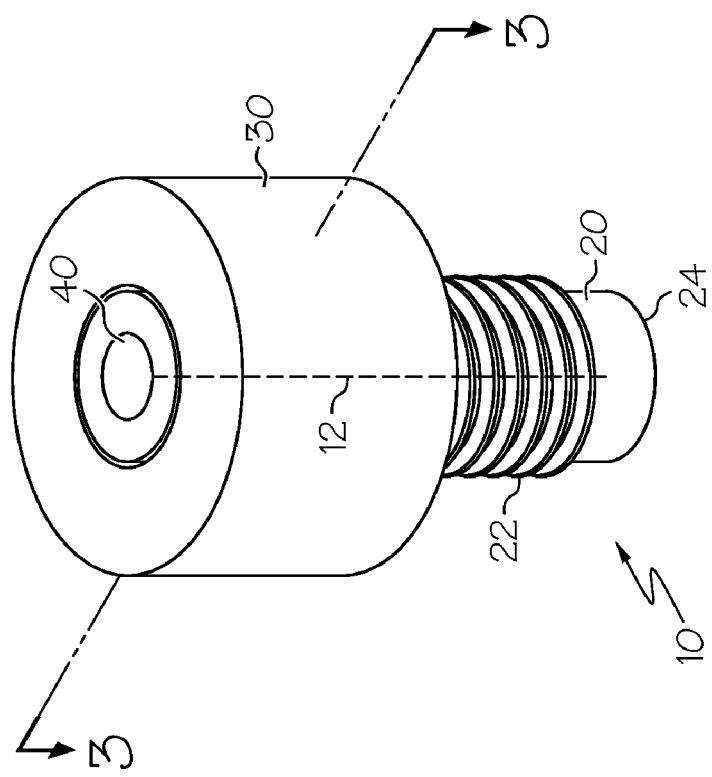
FIG. 1 is an illustration of an embodiment of a torque fitting according to the present invention comprising a threaded body portion, a torque-limiting body portion, and a channel.

Referring initially to FIGS. 1-6, the torque fitting 10 generally comprises a threaded body portion 20, a torque-limiting body portion 30, and a tubing channel 40. The threaded body portion 20 and the torque-limiting body portion 30 typically are arranged substantially concentrically along a longitudinal axis 12 of the torque fitting 10. As is clearly shown in FIG. 2, the tubing channel 40 is oriented along this longitudinal axis 12 of the torque fitting 10 extending through opposite ends of the fitting and defines a cross-sectional area sufficient to accommodate a length of tubing 50 along this longitudinal axis 12. The threaded body portion 20, meanwhile, generally comprises a mechanical thread 22 defining a compressive direction of rotation, as shown by the clockwise directional arrow depicted in FIGS. 3 and 4, and a decompressive direction of rotation, as shown by the counter-clockwise directional arrow depicted in FIG. 5.

As will be described in detail with FIGS. 3-6 below, the threaded body portion 20 and the torque-limiting body portion 30 generally are configured such that when torque below a threshold level is applied to the torque-limiting body portion 30, rotation of the torque-limiting body portion 30 in the compressive direction of rotation forces the threaded body portion 20 to rotate with the torque-limiting body portion 30. Therefore, the torque fitting 10 rotates in the compressive direction of rotation such that the torque fitting 10 may compress a compressible seal 52 positioned between the torque fitting 10 and another object, e.g., a port of a fluid-handling device. When, however, torque above the threshold level is applied to the torque-limiting body portion 30, rotation of the torque-limiting body portion 30 in the compressive direction of rotation fails to force the threaded body portion 20 to rotate with the torque-limiting body portion 30. Here, as torque above the threshold level is applied, only the torque-limiting body portion 30 of the torque fitting 10 continues to rotate in the compressive direction of rotation, while the threaded body portion 20 fails to rotate, thereby precluding any further compression of the compressible seal 52. This configuration of the torque fitting 10 precludes substantial fluid leakage at a point of tube/port interface.

Fluid leakage at the point of tube/port interface or premature seal degradation may occur if a fitting is over-tightened or if the seal is over-compressed. More specifically, the compressible seal 52 may deform, crack, or otherwise degrade if too much compression is applied to the seal. Alternatively, fluid leakage may occur if a fitting is under-tightened, resulting in an under-compression of the compressible seal 52. The torque fitting 10 of the present invention, described in greater detail below, is configured to prevent over-compression of the compressible seal 52 while ensuring sufficient compression of the compressible seal 52. The configuration of the torque fitting 10 enables the torque-limiting body portion 30 to force the rotation of the threaded body portion 20 to a point where sufficient compression is applied to the compressible seal 52 without compromising the integrity of the compressible seal 52 or allowing fluid to bypass the compressible seal 52. The torque fitting 10 allows a user to rotate the torque-limiting body portion 30 in the compressive direction of rotation until it fails to force the threaded body portion 20 to rotate with the torque-limiting body portion 30. The torque fitting 10 is configured such that the appropriate amount of compression is reached at the point at which the torque-limiting body portion 30 fails to force the threaded body portion 20 to rotate with it in the compressive direction of rotation. This condition will be readily apparent to the user as a significant drop in rotational resistance in the torque-limiting body portion 30 will occur. As will be understood from the detailed description of the particular embodiment of the fitting presented below, the user may also note an audible click once the appropriate amount of compression is reached.

The threaded body portion 20 and the torque-limiting body portion 30 generally are further configured such that rotation of the torque-limiting body portion 30 in the decompressive direction of rotation forces the threaded body portion 20 to rotate with the torque-limiting body portion 30, regardless of the level of torque applied to the torque-limiting body portion 30. Therefore, the threaded body portion 20 and the torque-limiting body portion 30 both rotate together in the decompressive direction of rotation.

Figure 3:
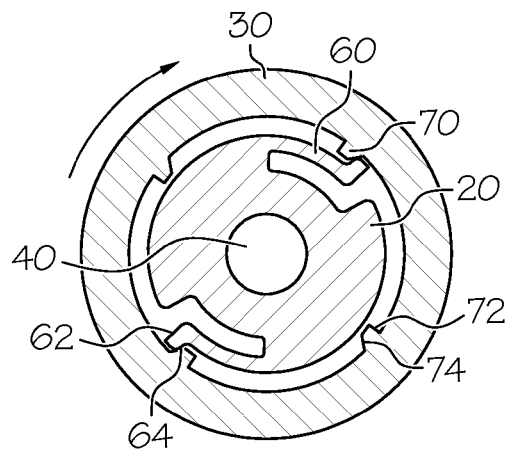
FIG. 3 is an illustration of an embodiment of a torque fitting according to the present invention wherein an engagement between an abutment and a lever forces the threaded body portion to rotate in a compressive direction of rotation with the torque-limiting body portion.

As depicted in FIGS. 3-6, the threaded body portion 20 comprises a lever 60 and the torque-limiting body portion 30 comprises an abutment 70. The lever 60 comprises a first arresting surface 62 and a yielding surface 64, while the abutment 70 comprises a second arresting surface 72 and an engaging surface 74. Referring to FIG. 3, the yielding surface 64 and the engaging surface 74 are configured to engage such that when torque below the threshold level is applied to the torque-limiting body portion 30, the engagement of the yielding surface 64 and the engaging surface 74 forces the threaded body portion 20 to rotate with the torque-limiting body portion 30. This condition remains until the appropriate amount of compression is applied to the compressible seal 52.

Figure 4:
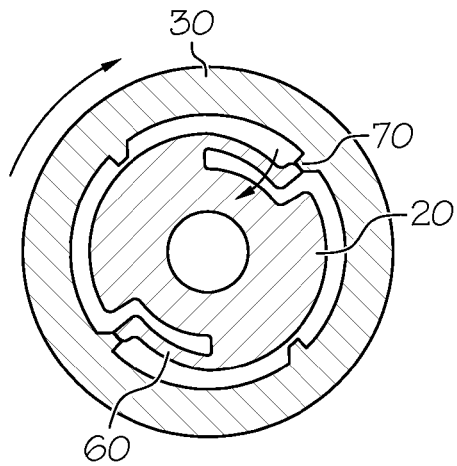
FIG. 4 is an illustration of an embodiment of a torque fitting according to the present invention wherein a deflection of the lever by the abutment fails to force the threaded body portion to rotate in a compressive direction of rotation with the torque-limiting body portion.

Specifically, as is illustrated in FIGS. 3 and 4, the engaging surface 74 contacts the yielding surface 64 and deflects the lever 60 when torque is applied in rotating the torque-limiting body portion 30 in the compressive direction of rotation. In the illustrated embodiment, this deflection of the lever 60 by the abutment 70 causes the lever 60 to flex toward the threaded body portion 20 and away from the torque-limiting body portion 30. The degree of this deflection will vary depending upon the torque applied in rotating the torque-limiting body portion 30 in the compressive direction of rotation. FIG. 3 illustrates a condition where the degree of deflection is minimal and, as such, the torque-limiting body portion 30 will force the threaded body portion 20 to rotate with it in the compressive direction of rotation. FIG. 4 illustrates a condition where the amount of torque applied to the torque limiting body portion has reached or exceeded a threshold level of torque. Under this condition, the torque-limiting body portion 30 will not force the threaded body portion 20 to rotate with it in the compressive direction of rotation because the lever 60 deflects an amount sufficient to allow the lever 60 to bypass abutment 70. The torque-limiting body portion 30 rotates substantially freely around the threaded body portion 20 in the compressive direction of rotation once the lever 60 has bypassed the abutment 70. The lever 60 is preferably provided with a degree of elasticity that is sufficient to enable repetitive deflection of the lever 60. As FIGS. 3 and 4 clearly show, when the lever 60 is deflected and flexes an amount sufficient to allow the lever 60 to bypass the abutment 70, there is no resultant change in the cross-sectional area of the channel 40.

The torque fitting 10 is configured such that the amount of compression applied to the compressible seal 52 is established by the size and shape of the abutment 70 and the size, shape, and rigidity of the lever 60. Specific examples of means for tailoring the degree of torque that can be applied to the threaded body portion are given below. However, it is noted that those practicing the present invention should appreciate that a wide array of lever and abutment characteristics can be configured to tailor the amount of torque that can be applied to the threaded body portion.

For example, the rigidity of the lever, which can be a function of many factors (composition, size, shape, orientation, thickness, etc.), can be tailored to determine the amount of torque that can be applied to the threaded body portion 20 via the torque-limiting body portion 30. The less rigid the configuration of the lever 60, the lower the threshold level of torque applied. The more rigid the configuration of the lever 60, the higher the threshold level of torque applied. Once the threshold level of torque is exceeded, the engagement between the yielding surface 64 and the engaging surface 74 is lost such that the lever 60 bypasses the abutment 70 and no further compression can be applied to the compressible seal 52.

As a further example, the degree to which the abutment 70 protrudes from the otherwise uniform surface of the body portion carrying the abutment 70 and the degree to which the yielding surface 64 of the lever 60 extends into the corresponding depth dimension defined by the abutment 70 can also be tailored to determine the amount of torque that can be applied to the threaded body portion 20. As we note above, a given degree of deflection is required for the lever 60 to bypass the abutment 70. Those practicing the present invention can configure the torque fitting 10 to permit application of a relatively large degree of torque by providing a relatively large abutment 70 and configuring the lever 60 to protrude a relatively large extent into the depth defined by the abutment. In contrast, a smaller abutment 70 or a smaller lever protrusion will permit application of a relatively low degree of torque.

Figure 5:
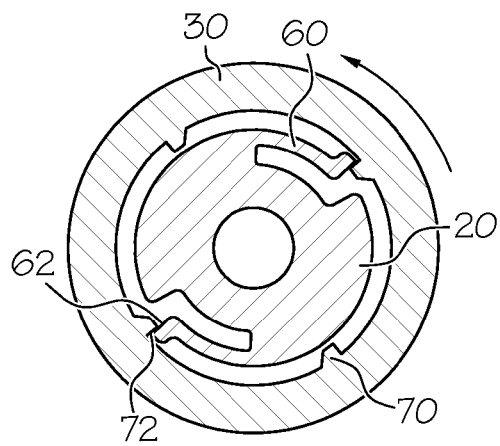
FIG. 5 is an illustration of an embodiment of a torque fitting according to the present invention wherein engagement between the abutment and the lever forces the threaded body portion to rotate in a decompressive direction of rotation with the torque-limiting body portion.

As shown in FIG. 5, the engagement of the first and second arresting surfaces 62, 72 forces the threaded body portion 20 to rotate with the torque-limiting body portion 30 when the torque-limiting body portion 30 rotates in the decompressive direction of rotation. Stated differently, the first and second arresting surfaces 62, 72 are configured to arrest relative rotation between the threaded body portion 20 and the torque-limiting body portion 30 when the arresting surfaces 62, 72 are engaged.

Figure 6:
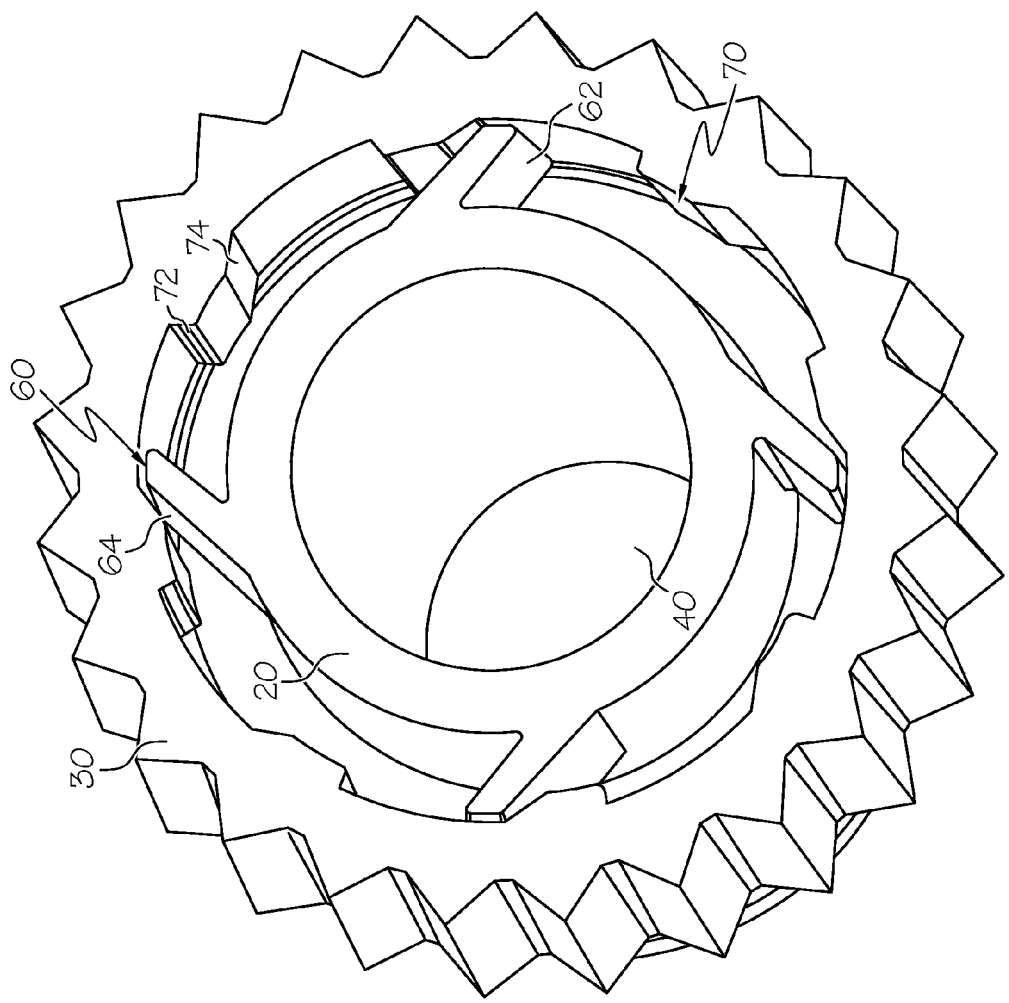
FIG. 6 is an illustration of an embodiment of a torque fitting according to the present invention wherein an engagement between an abutment and a lever forces the threaded body portion to rotate with the torque-limiting body portion and wherein a deflection of the lever by the abutment fails to force the threaded body portion to rotate with the torque-limiting body portion.

In defining the present invention, reference is made to a condition where the lever 60 bypasses the abutment 70. This recitation should not be taken to require that the torque limiting body portion 30 comprises the lever 60. Rather, the bypass condition is merely utilized herein to relate to a condition of relative motion between the lever 60 and abutment 70, when a threshold level of torque is reached, without regard to which body portion comprises the lever 60. It is further contemplated by the present invention that the threaded body portion 20 may comprise the abutment 70, while the torque-limiting body portion 30 may comprise the lever 60. The present invention also contemplates that a body portion of the torque fitting 10 may comprise more than one lever 60, while the other body portion of the torque fitting 10 may comprise more than one abutment 70. Further, the threaded body portion 20 may be configured such that the mechanical thread 22 may be positioned on an exterior surface, an interior surface, or both, of the threaded body portion 20. It is contemplated that the embodiment illustrated in FIG. 6 is simply another embodiment of a torque fitting varied from the embodiment shown in FIGS. 3-5, but which operates in much the same way as that described herein with respect to FIGS. 3-5.

Referring again to FIGS. 1 and 2, the threaded body portion 20 of the torque fitting 10 may further comprise an end that comprises a sealing edge 24. This sealing edge 24 may be configured as a flat face on the underside of the threaded body portion 20 and generally is configured to cooperate with a compressible seal 52 formed at the end of the length of tubing 50. It is contemplated that the compressible seal 52 may be distinct from or integral with the tubing 50 and may take the form of a gasket, o-ring, or other sealing device. For example, in one embodiment, clearly shown in FIGS. 2 and 7, the compressible seal 52 is integral with the tubing 50 and is presented as a flanged portion formed at the end of the length of tubing 50. This flanged portion is configured to extend over the sealing edge 24 of the threaded body portion 20. Thus, as the torque fitting 10 rotates in the compressive direction of rotation, it compresses the compressible seal 52 between the sealing edge 24 and a surface 125 of the port 122 of the fluid-handling device 120. This compressible seal 52, in coordination with the sealing edge 24, is configured to prevent substantial fluid leakage at the tube/port interface (i.e., where the compressible seal 52 abuts the surface 125 of the port 122 when the torque fitting 10 is tightened into the port 122). This compression achieved by the torque fitting 10 generally is enabled, because the port 122 comprises a threaded surface 124 that corresponds with the mechanical thread 22 of the threaded body portion 20.

FIG. 7 shows that the present invention may also relate to an assembly 1 comprising the torque fitting 10 and a length of tubing 50 that is accommodated by the tubing channel 40 of the torque fitting 10. This assembly 1 may further comprise the aforementioned fluid-handling device 120 having a port 122 and, in addition, a gasket, o-ring, or other sealing device.

It is noted that terms like "preferably," "commonly," "generally," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "assembly" is utilized herein to represent a combination of components and individual components, regardless of whether the components are combined with other components. For example, an "assembly" according to the present invention may comprise a fluid manifold having a port and a gasket, o-ring, or other sealing device in addition to a torque fitting 10 according to the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An assembly comprising a torque fitting and a length of tubing, wherein:
    the torque fitting comprises a threaded body portion, a torque-limiting body portion, and a tubing channel;
    the threaded body portion and the torque-limiting body portion are arranged concentrically along a longitudinal axis of the fitting;
    the tubing channel is oriented along the longitudinal axis of the fitting extending through opposite ends of the fitting and defines a cross-sectional area sufficient to accommodate the length of tubing along the longitudinal axis;
    the threaded body portion comprises a sealing edge on the underside of the threaded body portion at one of the opposite ends of the fitting and a mechanical thread defining a compressive direction of rotation and a decompressive direction of rotation;
    the threaded body portion and the torque-limiting body portion are configured such that,
        below a threshold level of torque applied to the torque-limiting body portion, rotation of the torque-limiting body portion in the compressive direction of rotation forces the threaded body portion to rotate with the torque-limiting body portion,
        above the threshold level of torque applied to the torque-limiting body portion, rotation of the torque-limiting body portion in the compressive direction of rotation fails to force the threaded body portion to rotate with the torque-limiting body portion, such that the torque-limiting body portion continues to rotate in the compressive direction of rotation but the threaded body portion fails to rotate, and
        rotation of the torque-limiting body portion in the decompressive direction of rotation forces the threaded body portion to rotate with the torque-limiting body portion,
    one of the threaded body portion or the torque-limiting body portion comprises a lever having a first arresting surface and a yielding surface, and the other of the threaded body portion or the torque-limiting body portion comprises an abutment having a second arresting surface and an engaging surface;
    the lever and the abutment are configured such that, when torque above the threshold level is applied by rotating the torque-limiting body portion in the compressive direction of rotation, the engaging surface contacts the yielding surface, the lever flexes toward the body portion comprising the lever and away from the body portion comprising the abutment, and the lever bypasses the abutment;
    the length of tubing comprises a compressible seal formed at an end of the length of tubing; and
    the length of tubing is accommodated by the tubing channel of the torque fitting to extend from the opposite ends of the fitting such that the compressible seal is positioned on the underside of the threaded body portion to cooperate with the sealing edge to prevent fluid leakage when the assembly is applied to a fluid-handling device.

2. The assembly of claim 1, wherein the lever and the abutment are configured such that the engaging surface and the yielding surface engage when torque below the threshold level is applied in rotating the torque-limiting body portion in the compressive direction of rotation.

3. The assembly of claim 1, wherein the first arresting surface of the lever and the second arresting surface of the abutment are configured to engage such that rotation of the torque-limiting body portion in the decompressive direction of rotation forces the threaded body portion to rotate with the torque-limiting body portion.

4. The assembly of claim 1, wherein the mechanical thread is positioned on an exterior surface of the threaded body portion.

5. The assembly of claim 1, wherein the assembly further comprises the fluid-handling device, and the fluid-handling device comprises a port.

6. The assembly of claim 5, wherein the compressible seal is compressed between the sealing edge of the threaded body portion and the port of the fluid-handling device to prevent fluid leakage at a tube-and-port interface.

7. The assembly of claim 1, wherein the threaded body portion comprises the lever and the torque-limiting body portion comprises the abutment.

8. The assembly of claim 7, wherein the threaded body portion is configured such that when the lever bypasses the adjustment, the cross-sectional area of the channel does not change.

9. An assembly comprising a torque fitting and a length of tubing, wherein:
    the torque fitting comprises a threaded body portion, a torque-limiting body portion, and a tubing channel;
    the threaded body portion comprises a sealing edge on the underside of the threaded body portion;
    the threaded body portion and the torque-limiting body portion are arranged concentrically along a longitudinal axis of the fitting;
    the channel is oriented along the longitudinal axis of the fitting and defines a cross-sectional area sufficient to accommodate the length of tubing along the longitudinal axis;
    one of the threaded body portion or the torque-limiting body portion comprises a lever;
    the other of the threaded body portion or the torque-limiting body portion comprises an abutment;
    the lever comprises a first arresting surface and a yielding surface;
    the abutment comprises a second arresting surface and an engaging surface;
    the lever and the abutment are configured such that the yielding surface of the lever and the engaging surface of the abutment engage when torque below a threshold level is applied in rotating the torque-limiting body portion in a compressive direction of rotation;

the lever and the abutment are further configured such that the engaging surface contacts the yielding surface and the lever deflects an amount sufficient to allow the lever to bypass the abutment when torque above the threshold level is applied in rotating the torque-limiting body portion in the compressive direction of rotation;

the deflection of the lever by the abutment causes the lever to flex toward the body portion comprising the lever and away from the body portion comprising the abutment;

the lever is configured with a degree of elasticity sufficient to enable repetitive flexion of the lever;

the lever and the abutment are further configured such that the first and second arresting surfaces engage when torque is applied in rotating the torque-limiting body portion in a decompressive direction of rotation such that the torque-limiting body portion forces the threaded body portion to rotate with the torque-limiting body portion;

the length of tubing comprises a compressible seal formed at an end of the length of tubing; and the length of tubing is accommodated by the channel of the torque fitting such that the compressible seal is positioned to cooperate with the sealing edge to prevent fluid leakage when the assembly is applied to a fluid-handling device.

10. The assembly of claim 9, wherein the assembly further comprises the fluid-handling device, and the fluid-handling device comprises a port.

11. The assembly of claim 10, wherein the compressible seal is compressed between the sealing edge of the threaded body portion and the port of the fluid-handling device to prevent fluid leakage at a tube and port interface.

* * * * *